(No Model.)
G. W. CONDERMAN.
URINAL.
No. 590,964. Patented Oct. 5, 1897.
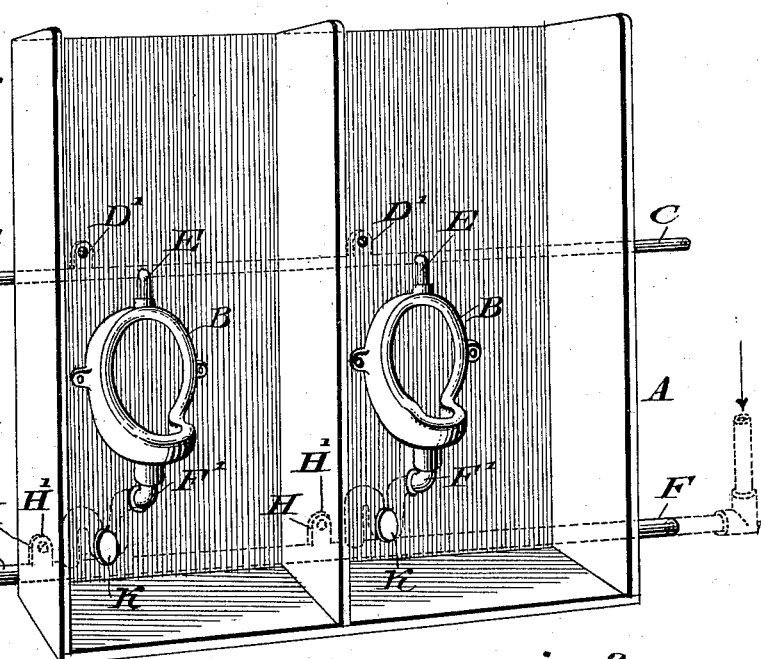
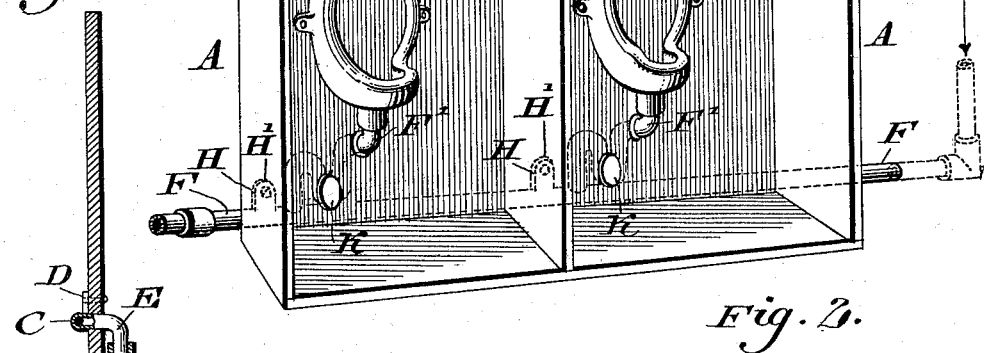
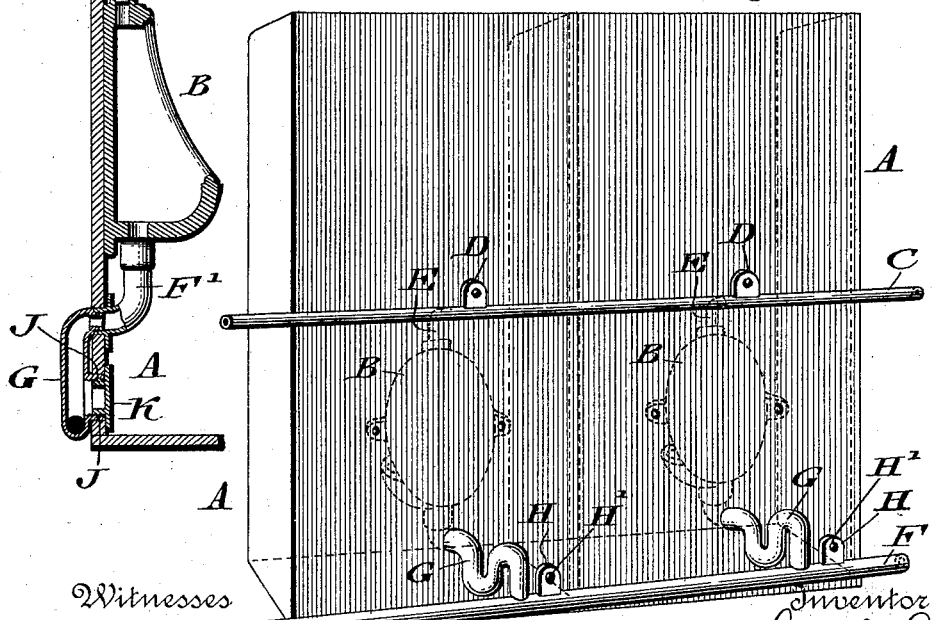
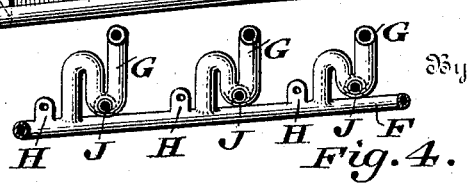

UNITED STATES PATENT OFFICE.

GEORGE W. CONDERMAN, OF PHILADELPHIA, PENNSYLVANIA.

URINAL.

SPECIFICATION forming part of Letters Patent No. 590,964, dated October 5, 1897.

Application filed March 21, 1895. Renewed March 24, 1897. Serial No. 629,091. (No model.)

*To all whom it may concern:*

Be it known that I, GEORGE W. CONDERMAN, a citizen of the United States, residing in the city and county of Philadelphia, State of Pennsylvania, have invented a new and useful Improvement in Urinals, which improvement is fully set forth in the following specification and accompanying drawings.

My invention consists of a urinal in which the supply and soil pipes are located at the rear of the stall thereof and held in place by screws which are accessible at the front of the stall, permitting the application and removal of said pipes without disturbing the back wall of the stall.

It also consists of a trap having its bend accessible at the front of the urinal, so that the same may be cleansed without disturbing the back wall of the stall.

Figures 1 and 2 represent perspective views of the front and rear of a urinal embodying my invention. Fig. 3 represents a vertical section on an enlarged scale. Fig. 4 represents a perspective view of the trap of the urinal.

Similar letters of reference indicate corresponding parts in the several figures.

Referring to the drawings, A designates a number of stalls of a urinal, and B designates the bowls, which are secured thereto in the usual manner.

C designates a pipe behind the wall of the stall for supplying water to the bowls B for flushing the same, said pipe having ears D connected therewith for connecting the pipe with the back wall of the stall by means of screws B', passed through the ears into said wall and having the heads at the front of the latter. The pipe is provided with branches E, which pass through openings in the wall for connecting the pipe with the urinal and directing the water into the latter.

F designates the soil or discharge pipe, which is rearward of the wall and with which are connected the traps G, the latter being attached by the branches F' to the bowls B, said branches passing through openings in the wall and said pipe being placed at an inclination, so as to have the proper fall, the traps being successively of increased height from one end to the other. The pipe F has formed or secured to it the ears H, by which the pipe may be fastened to the wall of the stalls by the screws H', whose heads are accessible at the front thereof.

On the front sides of the lower bends of the traps are collars J, which pass through openings in the wall of the stall and are closed by caps K, which also cover said openings, said caps in the present case being screwed into said collars, whereby the bends are practically closed. When, however, either of the traps is clogged and it is desirable to cleanse the same or remove obstructions therein, the cap thereof is removed, whereby the respective collar is uncovered and opened, thus permitting the insertion of a proper tool into the bend of the trap, now made accessible, this being accomplished without disturbing the wall of the stall or removing the bowls. It will also be seen that the pipes may be readily disconnected from the wall when the screws of the ears are removed, and the uncoupling of the branches and traps is effected without disturbing the wall of the stall or removing the bowls, and said pipes may be readily restored to their operative position and screwed or otherwise fastened conveniently from the front of the stall.

Having thus described my invention, what I claim as new, and desire to secure by Letters Patent, is—

1. In a urinal, a soil-pipe provided with an ear for attachment to a stall, a trap connected with said pipe, and a branch attached to said trap and the urinal-bowl, said branch passing through an opening in the wall of the stall, and a screw passing through the wall into said ear, the head of said screw being at the front of said wall, and said pipe being back of the same, said stall having an opening communicating with said trap, in combination with a cap which covers said opening in front of the stall and is connected with said trap substantially as described.

2. In a urinal, a wall or plate, a bowl on one side of said plate, a trap on the opposite side, a branch pipe passing through said plate and connecting said bowl and trap, and a cap on the same side of the plate as the bowl and secured to a collar on the trap which passes through said plate, said parts being combined substantially as described.

3. A urinal having a wall or plate, a water-supply pipe and a soil-pipe with a trap on one side of said plate and a bowl on the other side, ears on said pipes connected with said plate, branch pipes passing through said plate and connecting said supply-pipe and trap respectively, with said bowl, said trap having a collar thereon passing through said plate and a cap on the bowl side of said plate secured to said collar, said parts being combined substantially as described.

GEORGE W. CONDERMAN.

Witnesses:
JOHN A. WIEDERSHEIM,
R. H. GRAESER.